(12) United States Patent
Jonasson et al.

(10) Patent No.: US 11,091,164 B2
(45) Date of Patent: Aug. 17, 2021

(54) METHOD AND SYSTEM FOR COMPUTING A ROAD FRICTION ESTIMATE

(71) Applicant: VOLVO CAR CORPORATION, Gothenburg (SE)

(72) Inventors: Mats Jonasson, Partille (SE); Anton Albinsson, Gothenburg (SE); Fredrik Hans Bruzelius, Molndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 353 days.

(21) Appl. No.: 15/960,776

(22) Filed: Apr. 24, 2018

(65) Prior Publication Data

US 2018/0319404 A1    Nov. 8, 2018

(30) Foreign Application Priority Data

May 3, 2017   (EP) .................................... 17169229

(51) Int. Cl.
*B60W 40/068*   (2012.01)
*B60T 8/172*    (2006.01)
(Continued)

(52) U.S. Cl.
CPC .......... *B60W 40/068* (2013.01); *B60T 8/172* (2013.01); *B60W 10/04* (2013.01); *B60W 10/18* (2013.01);
(Continued)

(58) Field of Classification Search
CPC .. B60T 8/172; B60T 2210/12; B60T 2240/02; B60T 8/505; B60W 10/04;
(Continued)

(56) References Cited

U.S. PATENT DOCUMENTS

| 2010/0077847 A1 | 4/2010 | Joe et al. |
| 2010/0114449 A1 | 5/2010 | Shiozawa et al. |

(Continued)

FOREIGN PATENT DOCUMENTS

| CN | 101657345 A | 2/2010 |
| CN | 102024095 A | 4/2011 |

(Continued)

OTHER PUBLICATIONS

Extended European Search Report dated Oct. 18, 2017, Application No. 17169229.6-1762, Applicant Volvo Car Corporation, 5 Pages.
First Office Action for Chinese Application No. 201810379587.X, dated Nov. 27, 2020, 10 Pages.

*Primary Examiner* — Christian Chace
*Assistant Examiner* — Jordan S Fei
(74) *Attorney, Agent, or Firm* — Brooks Kushman P.C.

(57) ABSTRACT

The present disclosure relates to a method for computing a friction estimate between a road surface and a tire of a vehicle. The method comprises applying a controllable torque to at least one of wheel of the vehicle and determining a vehicle velocity when the controllable torque is applied. Estimate a present tire force acting on the first tire when the torque is applied. Based on a vehicle velocity, estimate the present slip of the tire. Determining a present gradient of the tire force with respect to the slip based on the present tire force and the value indicative of the present slip. When the present gradient exceeds a predetermined first gradient threshold value and is below predetermined second gradient threshold value, compute the friction estimate.

16 Claims, 11 Drawing Sheets

(51) Int. Cl.
*B60W 10/04* (2006.01)
*B60W 10/18* (2012.01)
*B60W 40/12* (2012.01)

(52) U.S. Cl.
CPC .......... *B60W 40/12* (2013.01); *B60T 2210/12* (2013.01); *B60W 2520/10* (2013.01); *B60W 2520/26* (2013.01); *B60W 2710/0666* (2013.01); *B60W 2710/083* (2013.01); *B60W 2720/14* (2013.01); *B60W 2720/26* (2013.01); *B60W 2720/30* (2013.01); *B60W 2720/40* (2013.01)

(58) Field of Classification Search
CPC .. B60W 10/18; B60W 40/12; B60W 2520/10; B60W 2520/26; B60W 2710/0666; B60W 2710/083; B60W 2720/14; B60W 2720/26; B60W 2720/30; B60W 2720/40; B60W 40/00; B60W 40/105; B60W 40/068; B60G 2400/822; B62D 6/006; E01F 9/506; F16D 2500/3125; F16H 2061/205; G01N 19/02
See application file for complete search history.

(56) References Cited

U.S. PATENT DOCUMENTS

| | | | |
|---|---|---|---|
| 2011/0015906 A1 | 1/2011 | Bian et al. | |
| 2011/0118935 A1 | 5/2011 | Shiozawa et al. | |
| 2011/0130974 A1 | 6/2011 | Yngve et al. | |
| 2011/0209521 A1* | 9/2011 | Shiozawa | B60L 15/2036 73/9 |
| 2012/0024038 A1* | 2/2012 | von Tardy-Tuch | B60T 8/172 73/9 |
| 2013/0074576 A1 | 3/2013 | Kouchi et al. | |
| 2015/0284006 A1* | 10/2015 | Singh | G01M 17/02 702/41 |
| 2018/0217050 A1* | 8/2018 | Heil | B60T 8/172 |

FOREIGN PATENT DOCUMENTS

| | | |
|---|---|---|
| CN | 102076543 A | 5/2011 |
| CN | 102202949 A | 9/2011 |
| DE | 10 2009 022 592 A1 | 12/2010 |
| DE | 10 2012 217 772 A1 | 4/2014 |
| EP | 1 964 736 A1 | 9/2008 |
| EP | 3 106 360 A1 | 12/2016 |
| JP | 2010195326 A | 9/2010 |
| JP | 2013067354 A | 4/2013 |
| WO | 2009/060075 A2 | 5/2009 |

* cited by examiner

METHOD AND SYSTEM FOR COMPUTING A ROAD FRICTION ESTIMATE

CROSS-REFERENCE TO RELATED APPLICATIONS

This application claims foreign priority benefits under 35 U.S.C. § 119(a)-(d) to European patent application number EP 17169229.6, filed May 3, 2017, which is incorporated by reference in its entirety.

TECHNICAL FIELD

The present disclosure relates to a method for computing a friction estimate between a road surface and a tire of a vehicle. The present disclosure further relates to a corresponding system and to a vehicle comprising such a system.

BACKGROUND

Active safety is becoming more advanced in today's vehicles as the automotive technology is evolving. For example, most new vehicles are equipped with active safety in the form of the well-known ABS brake system which allows a more controlled braking action for the driver of the vehicle.

In a driving situation with a vehicle, the friction between the road and the tire is of high importance since it stipulates the amount of force that can be transferred from the vehicle to the ground. Thus, the friction is an important parameter for active safety systems when decisions have to be taken related to for example braking and steering with the vehicle. This is relevant both for manually driven vehicles and for autonomous vehicles.

Friction estimation may generally be done by analyzing a tire force versus the so-called slip, for example in the form of a slip angle ($\alpha_{slip}$), see FIGS. 1A-C. The slip angle is the angle between the travel direction V of the tire contact patch and the wheel hub direction $W_d$ (i.e., the pointing direction of the wheel). Turning to FIG. 1B which shows the wheel hub direction ($W_{dh}$), the travel direction (V), an assumed possible parabolic force distribution ($\mu_{high}f(x)$) over the contact area between the tire and the road surface in the lateral direction (y) along x, the actual lateral force distribution $F_{yh}(x)$, the resultant lateral force $F_{yh}$, and the corresponding slip angle for a high friction case ($\mu_{high}$), and FIG. 1C which shows the wheel hub direction ($W_{dl}$), the travel direction (V), an assumed possible parabolic force distribution ($\mu_{low}f(x)$) over the contact area between the tire and the road surface in the lateral direction (y) along x, the actual lateral force distribution $F_{yl}(x)$ and the resultant lateral force $F_{yl}$, and the corresponding slip angle for a low friction case ($\mu_{low}$). A comparison between FIGS. 1B-C illustrates that in order to maintain the same resultant lateral tire force $F_y$ magnitude (resulting from the actual lateral force distribution $F_y(x)$ acting on the tire), a larger slip angle is needed for the low friction case (FIG. 1C) compared to the slip angle in the high friction case (FIG. 1B). In other words, it is generally difficult to reach the same lateral force in case of low friction compared to the case of high friction. The tire force (i.e., resultant force on the tire) may for example be derived from an inertial measurement unit of the vehicle or from the wheel torque. Furthermore, a pneumatic trail ($\Delta x_h$ and $\Delta x_l$) is defined as the orthogonal distance between the center of the contact patch between the tire and road and the resultant force vector $F_y$. Further details known in the art can be found in "Tire and vehicle dynamics" (Butterworth-Heinemann, Oxford, 2002) by Hans Pacejka.

EP3106360 describes a promising way to determine the road surface friction between a tire and the road by applying opposing torques on wheels. The opposing torques causes a slip such that a friction estimate may be obtained without disturbing the driver due to the opposing torques which effectively cancels each other out.

However, there is room for improvements in methods for determining road friction estimates.

SUMMARY

In view of above-mentioned prior art, it is an object of the present disclosure to provide an improved method for computing a friction estimate between a road surface and a tire of a vehicle.

According to a first aspect of the disclosure, there is provided a method for computing a friction estimate between a road surface and a tire of a vehicle when said vehicle is in motion along a course, said vehicle comprising two front wheels and two rear wheels, said method comprising the steps of: applying a controllable torque to at least one of said two front wheels and said two rear wheels, determining a vehicle velocity when the controllable torque is applied; estimating a present tire force acting on the tire of said one wheel when the torque is applied, based on said vehicle velocity, estimating a value indicative of the present slip of said tire when the torque is applied; determining a present gradient of said tire force with respect to said slip based on the present tire force and said value indicative of the present slip; wherein when the magnitude of said controllable torque is such that the present gradient exceeds a predetermined first gradient threshold value and is below predetermined second gradient threshold value, said first gradient threshold value being set to avoid an undesirable sliding condition for said tire: computing the friction estimate based on the estimated force, based on the value indicative of the slip, and based on the present gradient of said tire force with respect to said slip.

The present disclosure is based on the realization that a certain amount of slip is required for computing friction but the torques applied to generate the slip should not be too high such that undesirable sliding occurs. In other words, it is realized that it is beneficial to have a way to determine when to compute the friction estimate during applied torques such that the torques applied to the wheels cause enough slip but no uncontrollable sliding, i.e., a sufficient slip is present such that a friction estimate is computable while no sliding occurs and the tire is stable on the road.

It is preferred to reach relatively high torques to cause sufficient slip to thereby enhance the friction estimation. However, too high torques may cause the tire to slide and become unstable which is undesirable and may even cause situations where it becomes troublesome to control the steering of the vehicle. Furthermore, although it may be possible to determine a certain range of allowable slip in which to compute the friction, this slip range may change in case of changing tires on the wheels to tires having characteristics that differ from the characteristics of the previous wheels, or altered friction conditions (e.g., due to weather or road type), thereby risking sliding to occur before a friction estimate may be computed.

Thus, even if the tires are changed on the vehicle, sliding may be avoided since the invented method is at least partly independent of the choice of tires.

Accordingly, with the disclosure, by using the gradient threshold related to the gradient between the tire force with respect to slip it is possible to avoid sliding while still maintaining an accurate friction estimate. It is thereby provided a way to estimate at least approximately when to compute the friction estimate with sufficient accuracy and high confidence independently of tire and road conditions.

Thus, embodiments of the disclosure improve the accuracy of determined friction estimates between a tire on a wheel of a vehicle and a road by providing a way to determine when the friction estimate should be computed, while at the same time the impact on the driver of the vehicle is reduced.

A confidence (e.g., a confidence value) provides an indication of the likelihood that the friction estimate is the true friction between the road and tire. The confidence value is empirically determined from experiments. For example, a certain confidence value is empirically determined for known e.g., accumulations duration, vehicle velocity, vehicle velocity variation, amount of wheel excitation (i.e., level of wheel force), etc.

That the first gradient threshold value is set to avoid an undesirable sliding condition for the tire may be determined in various ways. For example, the first gradient threshold value may be empirically determined to avoid sliding and unstable driving conditions with the vehicle. Further, the first gradient threshold value may be based on measurements of the lateral force on the tire which is substantially reduced when sliding occurs, i.e., the lateral force reduces as the friction between the road and tire reduces.

According to one embodiment of the disclosure, the second gradient threshold value may be based on a minimum slip condition for the tire. Accordingly, the second gradient threshold is set based on a minimum slip required for feasible friction estimation. Hereby, it may be required that a threshold slip is achieved before the friction estimate is computed. In this way, it is with higher accuracy determined when a friction estimated is advantageously computed by requiring a threshold slip to occur in addition to the first gradient threshold value which prevents sliding to occur.

In one embodiment of the disclosure, the method may include determining a desired gradient of tire force with respect to slip, the desired gradient being above the predetermined first gradient threshold value and below the predetermined second gradient threshold value, and altering the controllable torque until a present gradient reaches the desired gradient before computing the friction estimate. Accordingly, when the present gradient reaches the desired gradient the friction estimate is computed. Hereby, by including the desired gradient and to control the torques such that that the desired gradient is reached, it is possible to control the torques such that the slip and wheel force reaches a most desirable operating point for computing the friction estimate.

The most desirable gradient may be chosen based on how close to the gradient thresholds (the first and/or the second gradient threshold) the present gradient should be allowed to reach, i.e., a low desired gradient to improve the accuracy of the friction estimate but being close to sliding (i.e., an aggressive approach) or a high desired gradient to surely prevent sliding (a more conservative approach). The desired gradient may for example also be based on weather conditions in the surroundings of the vehicle in addition to the above. In other words, the desired gradient is chosen such that a suitable trade-off between feasibility of friction estimation and driving stability is obtained.

The present gradient may be maintained close to the desired gradient within an allowable margin for a predetermined time duration. The allowable margin is meant to indicate that some deviation of the present gradient around the desired gradient is allowed during the time duration. The allowable margin may even stretch from the first gradient threshold to the second gradient threshold. The time duration is long enough such that friction estimate may be computed.

According to an embodiment of the disclosure, applying said controllable torque may comprise: applying first controllable torque to said one of said front wheels and rear wheels, and applying a second controllable torque to another one of said front wheels and rear wheels, wherein said first controllable torque and said second controllable torque are such that the net force and net torque on the vehicle caused by any one of the first controllable torque and the second controllable torque is compensated for by the other one of the first controllable torque and the second controllable torque, wherein when the magnitude of said controllable torques are such that the present gradient of said tire force with respect to said slip exceeds a predetermined first gradient threshold value and is below predetermined second gradient threshold value, said first gradient threshold value being set to avoid an undesirable sliding condition for said tire: computing the friction estimate based on the estimated force, the value indicative of the slip, and the present gradient of said tire force with respect to said slip. Hereby, an advantageous way of ensuring that the driver of the vehicle is not disturbed by the applied torques since the net force and net torque exerted on the vehicle is reduced or at least close to zero.

That the net force and net torque are compensated for should be interpreted broadly. A minor net force or torque is allowed as long as the driver's ability to control the vehicle is not substantially affected.

The tire force may be a longitudinal tire force along an axis parallel with the vehicle wheel hub direction and the controllable torque(s) may be tractive torque(s) or braking torque(s). Alternatively or additionally, the tire force may be a lateral tire force orthogonal to a vehicle wheel hub direction and the controllable torque(s) is/are a yaw torque(s).

In one embodiment, the tire force comprises a combination of a longitudinal tire force and a lateral tire force and the controllable torque(s) is/are a combination of a yaw torque and tractive torque(s) and/or braking torque(s).

According to a second aspect of the disclosure, there is provided a system for computing a friction estimate between a road surface and a tire of a vehicle when the vehicle is in motion along a course, the vehicle comprising two front wheels and two rear wheels, the system comprising: a torque applying unit for applying a controllable torque to at least one of the two front wheels and the two rear wheels; an inertial measurement unit (IMU) and a vehicle speed sensor for determining a velocity of the vehicle, and, a control unit module configured to: control the torque applying unit to apply a controllable torque to the one of the two front wheels and the two rear wheels, retrieve a vehicle velocity from the inertial measurement unit (IMU) or the wheel speed sensor when the controllable torque is applied; estimate a present tire force on the first tire and a value indicative of the present slip of the first tire when the torque is applied based on the vehicle velocity; determine a present gradient of the tire force with respect to the slip based on the present tire force and the value indicative of the present slip; wherein when the magnitude of the controllable torque is such that the present gradient exceeds a predetermined first gradient threshold value and is below predetermined second gradient threshold value, the first gradient threshold value being set to avoid an undesirable sliding condition for the tire: compute the friction estimate based on the estimated present force, the value indicative of the present slip, and the present gradient of the present tire force with respect to the present slip.

The value indicative of the present slip may be estimated from a relation between the rotational speed (w) of the wheel, the radius (r) of the wheel and the vehicle velocity ($v_x$) in case of a longitudinal slip, given by:

longitudinal slip=$(w*r-v_x)/v_x$.

In case of lateral slip, the relation is given by:

Slip angle ($\alpha$)=arctan($v_y/v_x$), where $v_y$ is the lateral velocity of the vehicle. Accelerometers and steering angles sensors arranged on the vehicle may be used to acquire data for calculating $v_y$.

The vehicle speed sensor may be a wheel speed sensor, a GPS, an optical speed sensor, or a combination thereof.

A control unit may include a microprocessor, microcontroller, programmable digital signal processor or another programmable device.

Effects and features of the second aspect of the disclosure are largely analogous to those described above in connection with the first aspect of the disclosure.

There is further provided a vehicle comprising the system. The vehicle may for example be an autonomous vehicle.

In summary, the present disclosure relates to a method and a system for computing a friction estimate between a road surface and a tire of a vehicle. The method comprises applying a controllable torque to at least one of wheel of the vehicle and determining a vehicle velocity when the controllable torque is applied. Estimate a present tire force acting on the first tire when the torque is applied. Based on a vehicle velocity, estimate the present slip of the tire. Determining a present gradient of the tire force with respect to the slip based on the present tire force and the value indicative of the present slip. When the present gradient exceeds a predetermined first gradient threshold value and is below predetermined second gradient threshold value, compute the friction estimate.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings.

DETAILED DESCRIPTION

Figure 1A:
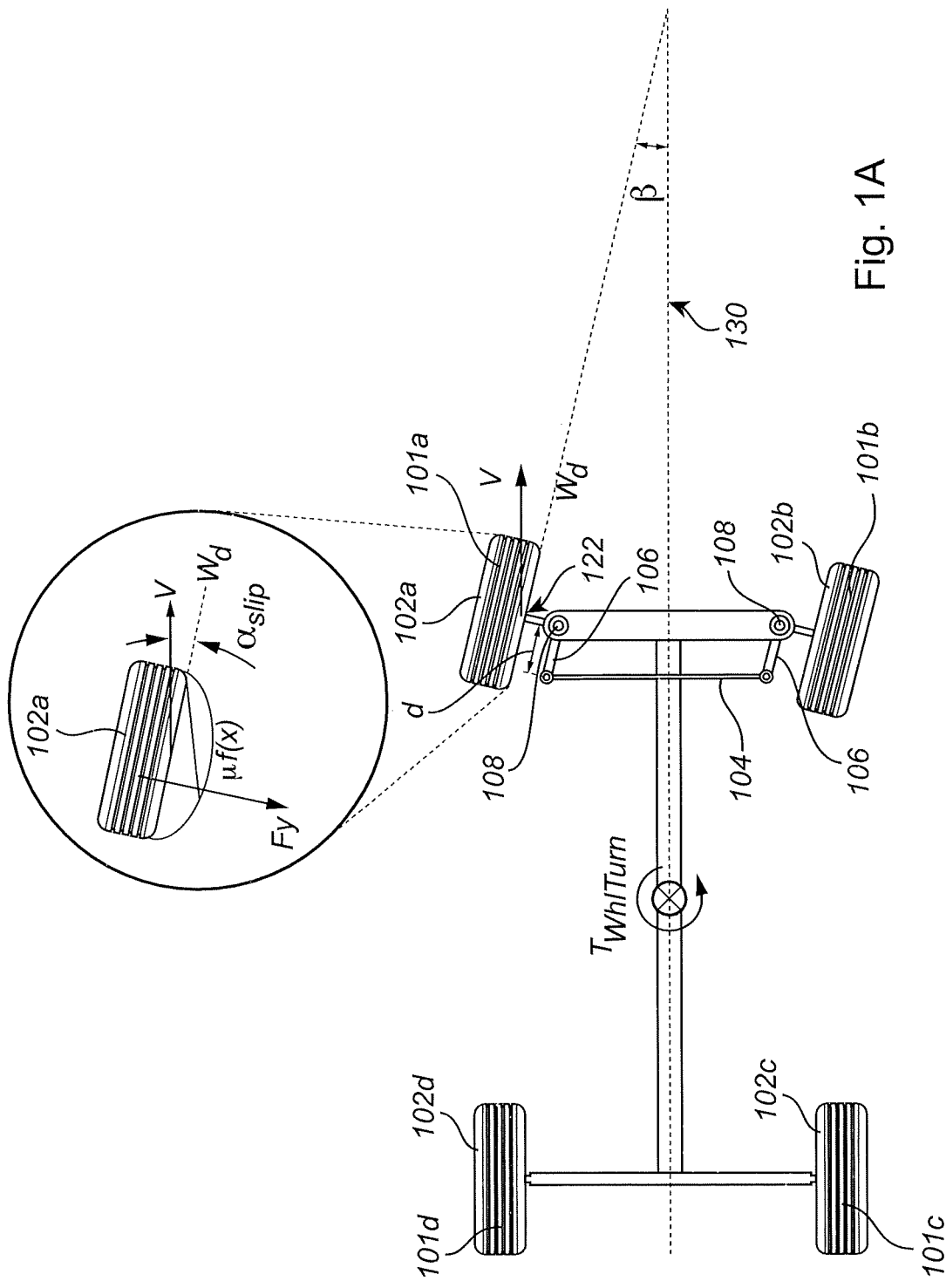
FIGS. 1A-C schematically illustrate parameters generally related to friction estimation.

In the present detailed description, various embodiments of the system and method according to the present disclosure are described. However, this disclosure may be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

In the following description it should be understood that the tire force may be any one of a lateral or a longitudinal tire force unless specified. For a lateral tire force, the slip is understood to be a slip angle. For a longitudinal tire force the slip is understood to be a longitudinal slip.

Figure 2A:
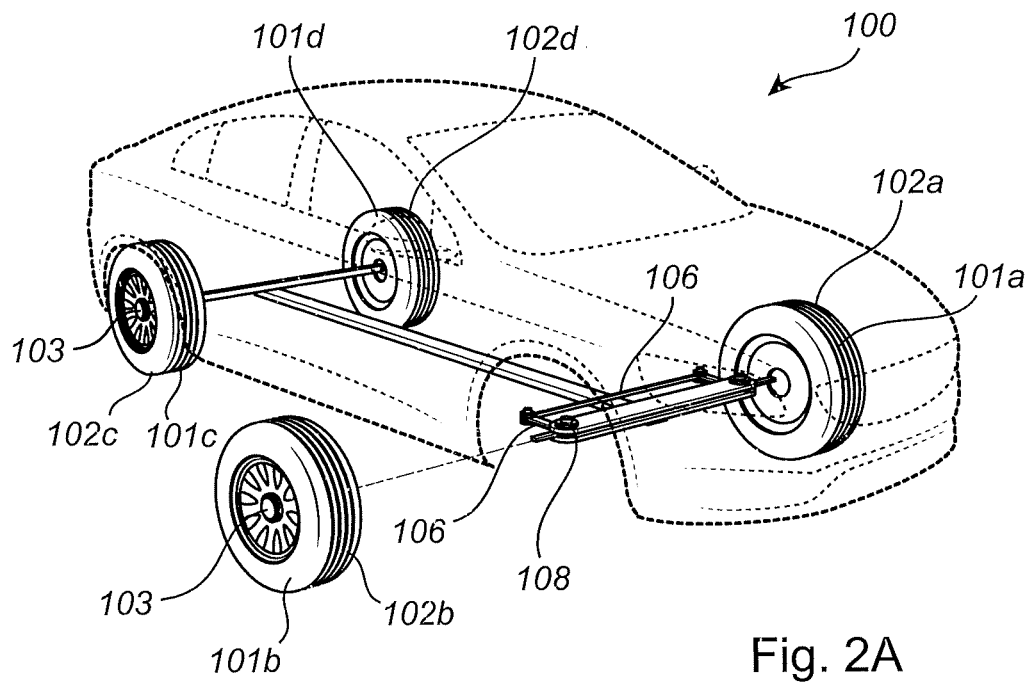
FIG. 2A conceptually illustrates a vehicle according to example embodiments of the disclosure.
Figure 2B:
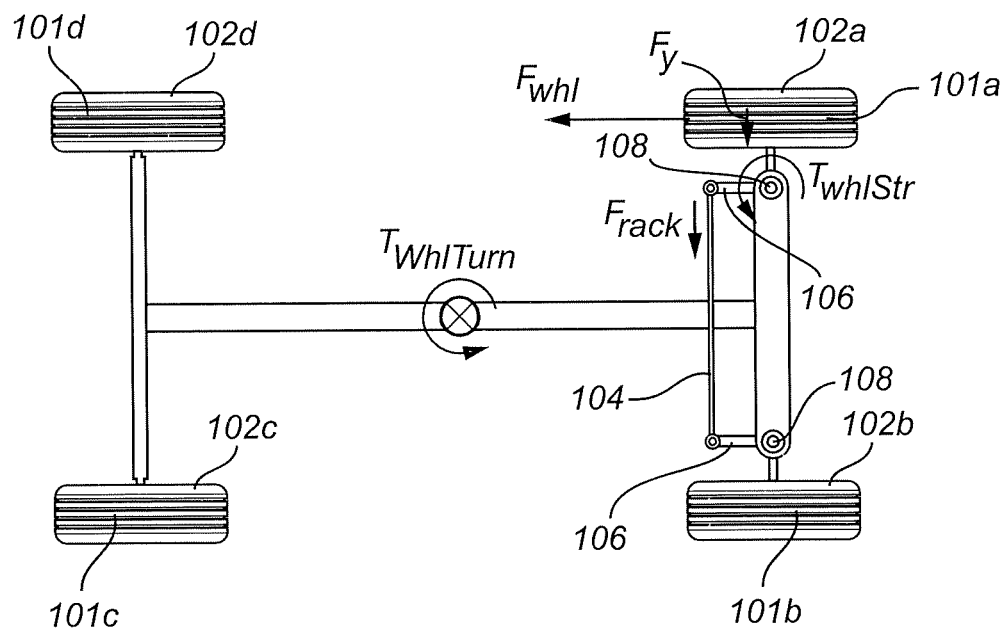
FIG. 2B conceptually illustrates a chassis wheel base with wheels of the vehicle in FIG. 2A.

FIG. 2A illustrates a vehicle 100 according to an embodiment of the disclosure. The vehicle 100 comprises at least one wheel 102a-b. The wheels 102a-b which may be steerable are here shown as the front wheels of the vehicle 100. The vehicle 100 further comprises rear wheels 102c-d. The wheels 102a-d each have a tire 101a-d mounted on a corresponding wheel hub 103 (not all are numbered). Furthermore, and with reference also to FIG. 2B, the vehicle 100 comprises an axle rack 104 pivotably attached to a linkage arm 106 which is connected to a steerable wheel 102a-b such that when the axle rack 104 is subjected to a force which causes a translational motion of the axle rack 104, the linkage arm 106 rotates about a kingpin 108 and thereby causes a turning motion of the wheel 102a-b. In this way, the vehicle is subject to a turning torque ($T_{whlTurn}$). The vehicle 100 may for example be an autonomous car.

Figures 1B, 1C:
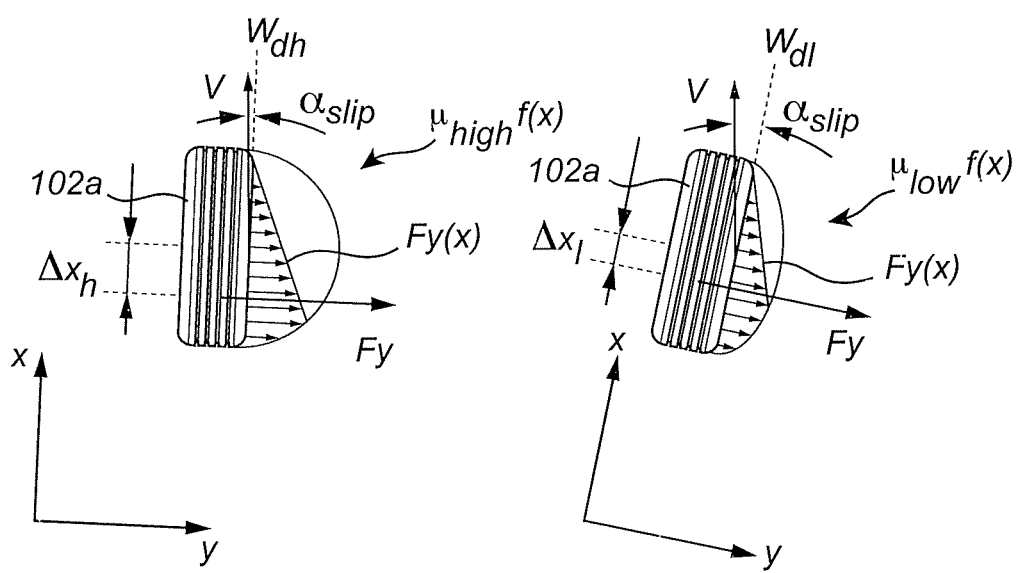

When applying a torque to a single front wheel 102a, the resulting force ($F_{Whl}$) between the wheel and the contact area (e.g., the road) generates a torque, $T_{WhlStr}$, that attempts to turn the front wheel 102a around the kingpin 108. The turning torque is in turn transferred to the axle rack 104 and can be monitored as the rack force, $F_{rack}$. In more detail and with reference to FIGS. 1B-C which illustrates a turning wheel (102a) at different friction conditions. The distance ($\Delta x_h$ and $\Delta x_l$) between the resultant lateral tire force $F_y$ is known as the pneumatic trail. The pneumatic trail ($\Delta x_h$ and $\Delta x_l$) (together with the caster trail, here included in the pneumatic trail definition $\Delta x_h$ and $\Delta x_l$) effectively forms a lever for the resultant lateral tire force $F_y$. Thus, with the pneumatic trail ($\Delta x_h$ and $\Delta x_l$) as the lever, the lateral force $F_y$ generates a torque on the wheel 102a, this torque is denoted $T_{WhlStr}$. This torque translates via the linkage arm 106 having a length d, to the axle rack 104 where the axle rack force $F_{rack}$ can be measured. For torque equilibrium, the axle rack force $F_{rack}$ multiplied with the length d of the linkage arm must equal the torque $T_{WhlStr}$. In other words, pneumatic trail*$F_y$=d*$F_{rack}$.

In a low friction case (FIG. 1C), the assumed parabolic force distribution over the contact area between the tire and the road surface in the lateral direction (y) along x ($\mu_{high}f(x)$) has a lower maximum magnitude illustrated by the parabolic curve being closer to the tire 102a. Thus, in order to obtain the same resultant lateral force $F_y$ the wheel has to turn further (so that the lateral force distribution $F_y(x)$ includes more of the assumed maximum parabolic force distribution $\mu_{low} f(x)$) thereby increasing the slip angle $\alpha$. This further moves the resultant lateral force $F_y$ closer to the center of the contact patch between the tire and the road, thus the pneumatic trail $\Delta x_1$ is shorter compared to in the high friction case ($\Delta x_h$ in FIG. 1B). Since the length d of the linkage arm 106 is the same in the high friction case and in the low friction case but the pneumatic trail varies, a difference in axle rack force will thereby reflect a difference in friction between the tire and road surface.

A wheel 102a subject to propulsion or braking (in FIG. 2B it is braking) is affected by lateral forces of different magnitude depending on the friction between the road surface and the tire of the wheel. The lateral force is generally a function ($F_y(T_{WhlStr}, \alpha_{slip})$) of the wheel torque ($T_{WhlStr}$), the coefficient of friction ($\mu$), and the slip angle ($\alpha_{slip}$), see FIGS. 1A-C. The lateral force $F_y$ is measurable via the rack force $F_{rack}$ as described with reference to FIGS. 2A-B and FIGS. 1A-C. Furthermore, the slip angle ($\alpha_{slip}$) generally depends on the velocities of the vehicle (lateral velocity, longitudinal velocity, and yaw velocity) and the steering angle $\beta$ (see FIG. 1A) of the vehicle. The steering angle is the angle between a longitudinal centerline 130 of the vehicle (between rear and front of the vehicle) and the wheel hub direction $W_d$ (see FIG. 1A). The steering angle may be measured by a steering angle sensor arranged on the steering column (not shown) of the vehicle. The sensor may measure the rotational angle of the steering wheel and thereby derive the steering angle. Another way to measure the steering angle is to determine the position (translational position) of the axle rack and therefrom derive the steering angle.

Generally, the value indicative of the present slip may be estimated from a relation between the rotational speed (w) of the wheel, the radius (r) of the wheel and the longitudinal vehicle velocity ($v_x$) In case of lateral slip, the relation may be given by:

$$\alpha_{slip} = \arctan(v_y/v_x),$$

where $v_y$ is the lateral velocity of the vehicle. In order to determine $v_y$, accelerometers and steering angles sensors arranged on the vehicle may be used to acquire data for calculating $v_y$.

Alternatively, the slip angle can generally be provided as a function ($\alpha$(velocity, steering angle)) of the steering angle and the velocities. From the two functions $F_y(T_{WhlStr}, \alpha_{slip})$ and $\alpha$(velocity, steering angle) the friction $\mu$ may be derived. For details regarding the functions ($F_y(T_{WhlStr}, \alpha_{slip})$ and $\alpha$(velocity, steering angle)) and relationships between the above parameters, see "Tire and vehicle dynamics" (Butterworth-Heinemann, Oxford, 2002) by Hans Pacejka (see in particular Chapter 1 and 3 of the Pacejka reference).

The slip does not have to be provided in the form of a slip angle as described above. Another equally applicable representation of slip is a longitudinal slip. In case of longitudinal slip, the longitudinal slip may be given by:

$$\text{longitudinal slip} = (w*r - v_x)/v_x.$$

Different embodiments of the disclosure will now be described with reference to FIGS. 3-9.

Figure 3:
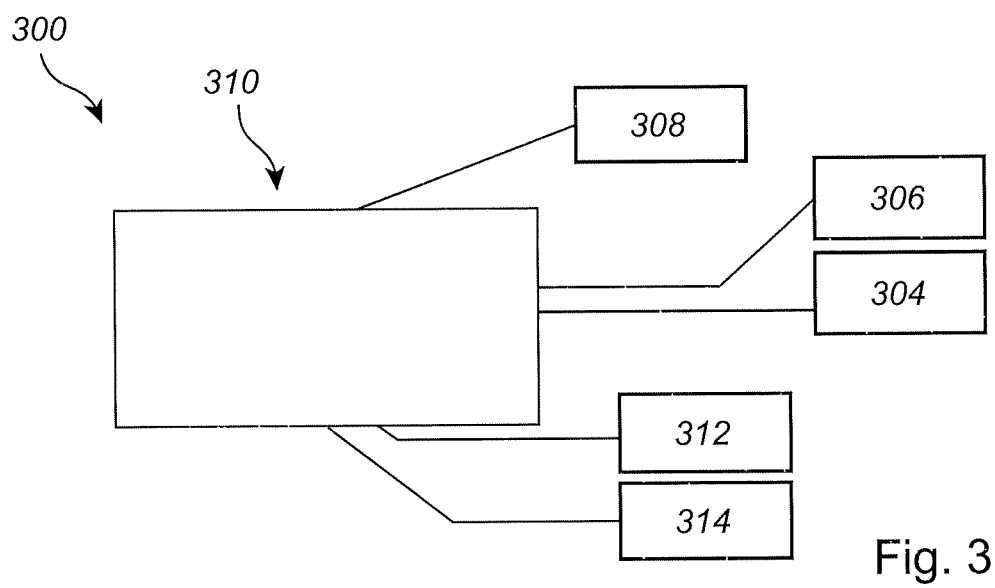
FIG. 3 schematically illustrates a system according to an exemplary embodiment of the disclosure.

FIG. 3 schematically illustrates a system for determining a friction estimate between a road surface and a tire of a vehicle 100 according to an example embodiment of the disclosure. The system comprises a torque applying unit 306 for applying a torque to the wheels. The torque applying unit 306 may be an internal combustion engine of the vehicle or a separate electrical motor for applying a longitudinal torque or a yaw torque. For applying a yaw torque the torque applying unit 306 may also include a steering mechanism such as an assist powered steering unit.

The system 300 further comprises vehicle state estimator comprising an inertial measurement unit (IMU) 308 for determining a velocity of the vehicle together with a vehicle speed sensor 314. The vehicle speed sensor may be a wheel speed sensor 314 (e.g., a tachometer 122, see FIG. 1A) is configured to determine the angular velocity of the wheel. In addition, the system may optionally comprise a global positioning system (GPS) 312. With the GPS 312 and the wheel speed sensor 314 the velocity of the vehicle may be determined with improved accuracy.

The IMU 308 may comprise accelerometers and/or gyroscopes such that at least the velocity of the vehicle in the plane of the contact surface between the vehicle 100 tire and the ground can be determined. Based on measured e.g., acceleration data, the vehicle mass and inertia, the lateral force and longitudinal force can be determined (via e.g., Newton second law relating mass and acceleration to force).

There is further a control unit 310 which is configured to control the torque applying unit 306 to apply a controllable torque to one of the two front wheels and the two rear wheels. The control unit 310 retrieves a vehicle velocity from the inertial measurement unit (308) (IMU) or the wheel speed sensor when the controllable torque is applied. Additionally, the control unit 310 estimates a present tire force on the first tire and a value indicative of the present slip of the first tire when the torque is applied based on the vehicle velocity. Based on the present tire force and the value indicative of the present slip the control unit 310 determines a present gradient of the tire force with respect to the slip. When the magnitude of the controllable torque is such that the present gradient exceeds a predetermined first gradient threshold value and is below predetermined second gradient threshold value the control unit 310 computes the friction estimate based on the estimated present force, the value indicative of the present slip, and the present gradient of the present tire force with respect to the present slip. The first gradient threshold value is set to avoid an undesirable sliding condition for the tire.

Figure 4:
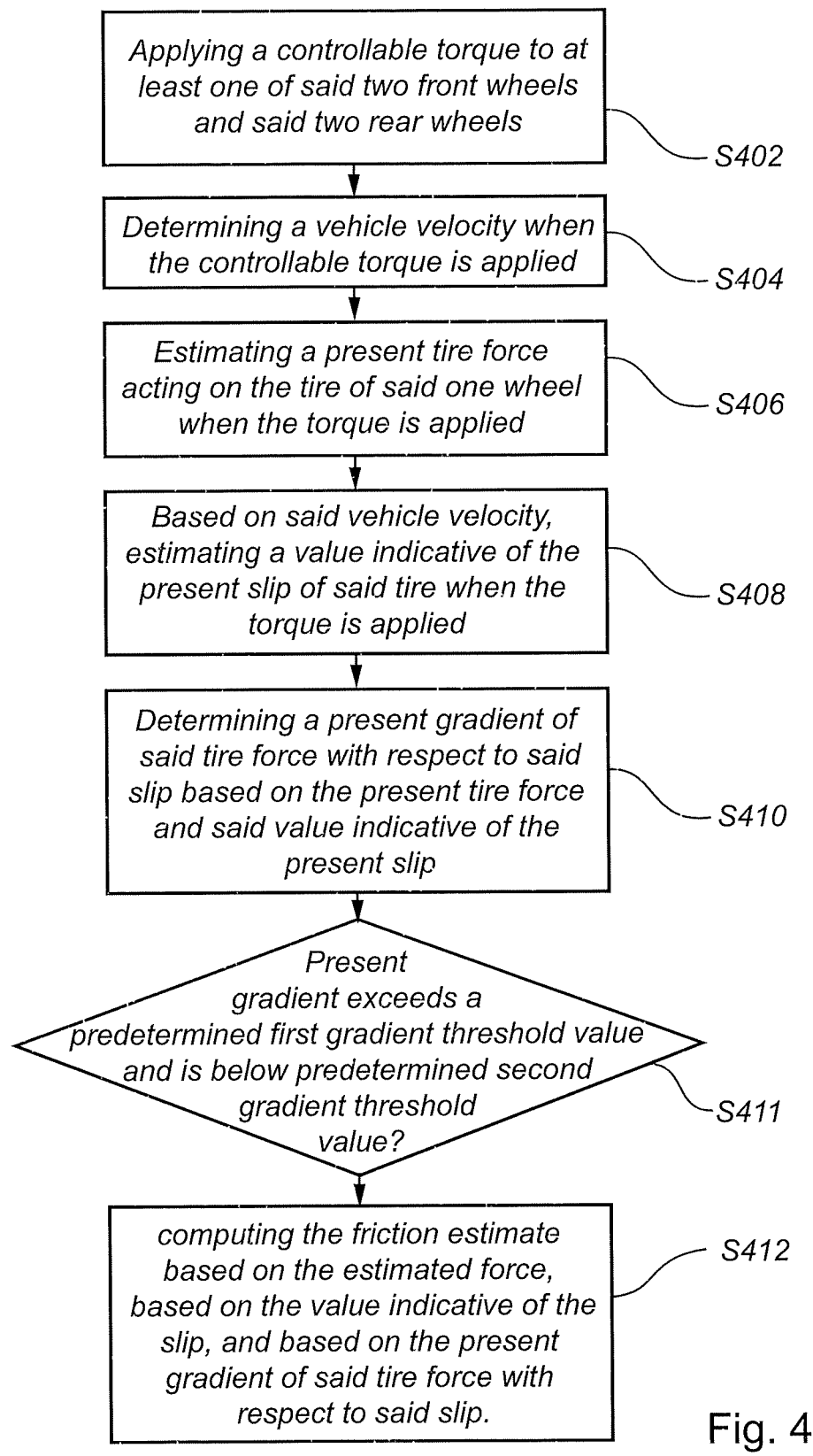
FIG. 4 is a flow-chart of method steps according to an exemplary embodiment of the disclosure.

FIG. 4 illustrates a flow chart of method steps according to an embodiment of the disclosure. In a first step S402, a controllable torque is applied to at least one of the two front wheels and the two rear wheels. The controllable torque may be e.g., a braking torque, a propulsion torque, or a yaw torque. In step S404 a vehicle velocity is determined when the controllable torque is applied. In other words, the vehicle velocity is determined during the time duration that the controllable torque is applied. Similarly, when the torque is applied a present tire force acting on the tire of the one wheel is estimated S406. Furthermore, based on the vehicle velocity, a value indicative of the present slip of the tire is estimated in step S408 when the torque is applied. Subsequently, a present gradient of the tire force with respect to the slip is determined S410 based on the present tire force and the value indicative of the present slip. When the magnitude of the controllable torque is such that the present gradient exceeds a predetermined first gradient threshold value and is below predetermined second gradient threshold value, the friction estimate is computed S412 and is based on the estimated force, based on the value indicative of the slip, and based on the present gradient of the tire force with respect to the slip. The first gradient threshold value is set such that as to avoid an undesirable sliding condition for the tire. The value indicative of the present slip may be the slip angle or a longitudinal slip.

Figure 5:
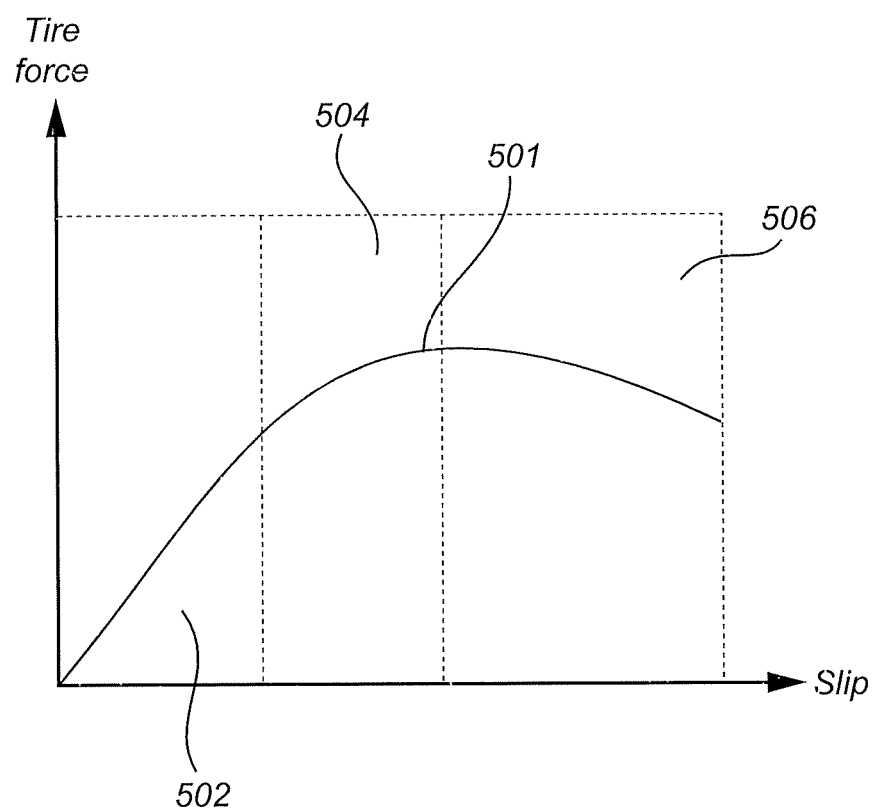
FIG. 5 illustrates a relation between tire force and slip for conceptual understanding of the disclosure.

FIG. 5 is a graph conceptually showing a general relationship between tire force acting on a tire and the slip, the relationship is illustrated by the curve 501. In order to be able to determine a friction estimate, some degree of slip is required. In the region 502, the tire force is relatively low as well as the slip. Consequently, in the region 502, the tire is stable on the road and no sliding occurs whereby the tire experiences full adhesion to the road. During the conditions in the region 502, it is not feasible to estimate the friction due to the low slip which would result in a very low confidence friction estimate.

In the indicated region 506 the tire force generally reduces as the slip increases which is indicative of that the tire is sliding and thus has no or little adhesion to the road. In this region 506, it is not feasible to determine the friction estimate and additionally, the driving comfort is undesirable due to the sliding of the tires.

Turning now to the center region 504 indicated in FIG. 5. In this region 504, the tire force is such that the tire is only partly sliding with some degree of slip. In the region 504 the friction between the tire and the ground is still such that the tire is stable and still has adhesion to the ground but with the addition of slip, and the slip is large enough to reliably calculate a friction estimate. It is desirable to determine the friction estimate when the tire force and the slip are in the center region 504 of the tire force versus slip graph.

Figure 6:
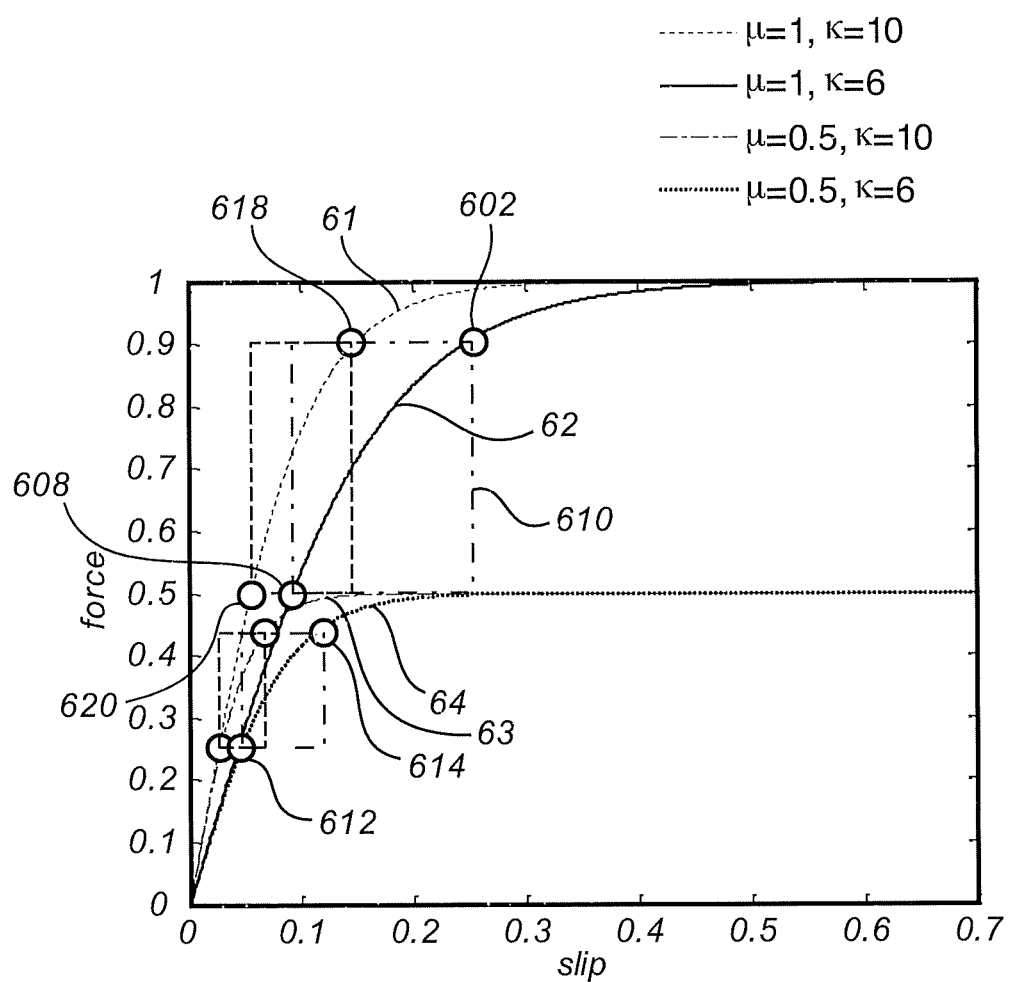
FIG. 6 illustrates relations between tire force and slip for different friction conditions and stiffness of tires.

FIG. 6 illustrates four curves 61, 62, 63, 64 of normalized longitudinal wheel force versus slip for four different combinations of friction ($\mu$) and tire stiffness ($\kappa$). The circles (not all are numbered) in the graph indicate where the force for the respective curve is 50% (608, 612, 620) and 90% (602, 614, 618) of the maximum force for the respective combination of friction and stiffness. The indicated rectangles (610, only numbered for curve 62) indicates the desired region given by $0.5 \cdot f_{max} < f < 0.9 \cdot f_{max}$ where f is the tire force hence $f_{max}$ is the maximum tire force. Ideally, it would be desirable to monitor whether the force is within the desired region but this is practically difficult since the max force is difficult to know beforehand.

In prior art it is common to instead monitor the slip. However, assume that the system is configured for the $\mu=1$, $\iota=6$ tire case (curve 62), then it would be required to stay within the boundaries of about 0.1<slip<0.25 as may be read from the circles 602 and 608. Assume then that the system enters a low friction situation (e.g., curve 64, $\mu=0.5$, $\kappa=6$), for example caused by that the road conditions change (e.g., to an icy or wet road), then the desired region would instead be about 0.05<slip<0.12 as may be read from the circles 612 and 614 which means if we rely on the desired region in case 62, there is a risk of reaches too high force and cause sliding of the tires.

Similarly, if the tires are changed to higher stiffness tires (curve 61, $\mu=1$, $\kappa=10$) it would be required to maintained within about 0.05<slip<0.16 as may be read from the circles 618 and 620. However, if we rely on the predetermined curve 62 also for the high stiffness tires, it is again a risk of reaching a too high force. Accordingly, relying on the slip for determining when to compute a friction estimate is not reliable.

Figure 7:
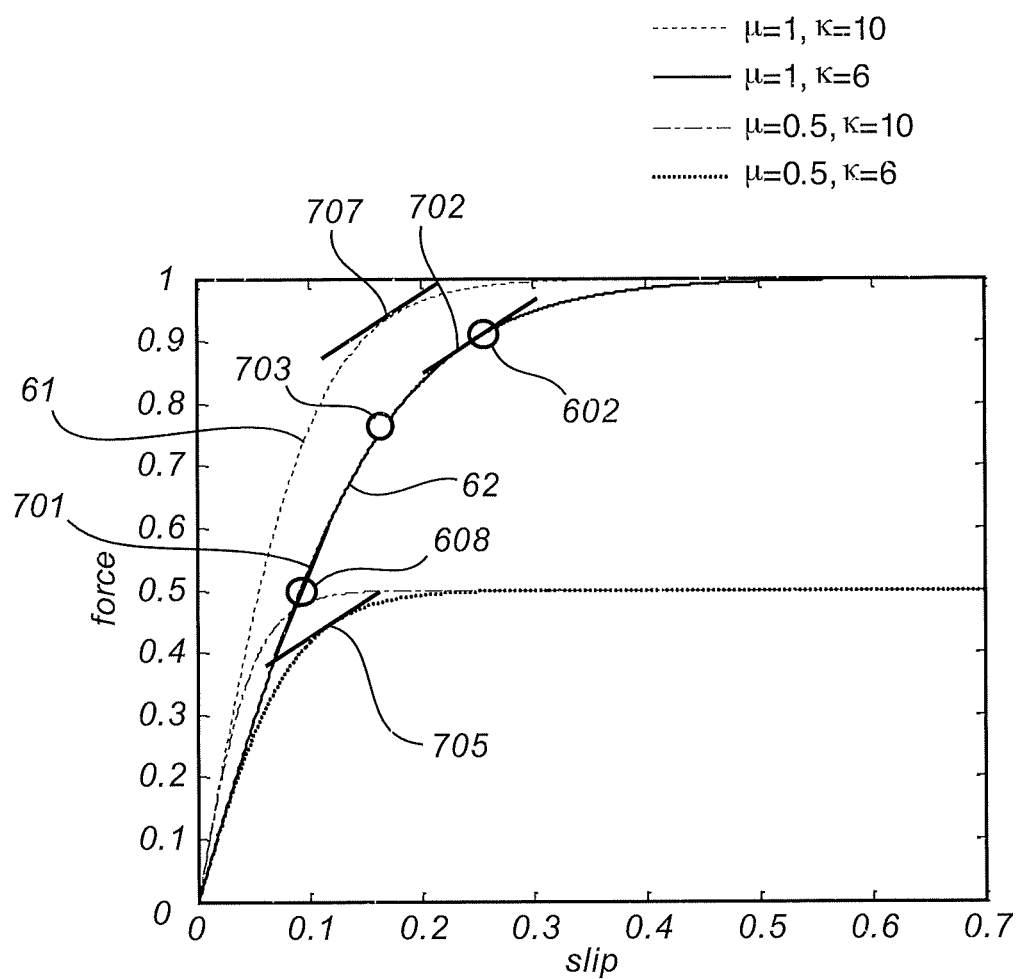
FIG. 7 illustrates relations between tire force and slip with indicated gradient thresholds.

Instead, and now with reference to FIG. 7, and according to the disclosure, it is advantageous to determine a gradient (df/ds) of the force with respect to the slip. Then, it is required that first gradient<present gradient<second gradient.

In FIG. 7 there is shown the first gradient 702 and the second gradient 701 for the curve 62 to conceptually illustrate the boundaries in the force-slip curve determined by the gradients 701 and 702. There is further shown a desired operating point 703 which may be based on a desired gradient. The desired gradient may be calculated based on a tire model or on empirical testing. The desired gradient is larger than the first gradient 702 and smaller than the second gradient 701.

It should further be noted that the second gradient 701 may be determined by a minimum slip condition, i.e., first it is determined what is the minimum slip that has to be reached for a feasible friction estimate to be possible (i.e., to enter the region 504 in FIG. 5) and subsequently the second gradient 701 is determined therefrom. The second gradient threshold may be empirically determined, i.e., from tests of different slip versus feasibility of friction estimate based on e.g., confidence of the friction estimate. Another way to determine the second gradient threshold may be from a theoretical model.

There is further shown first gradients 705, 707 for the curves 61 and 64. It should be noted that the gradients 702, 705, 707 may be equal to each other, thus providing at least upper boundaries for the desired region 504 regardless of friction condition or stiffness. In a similar manner, the second gradient provides lower boundaries for the desired region 504. Thus, by using gradient thresholds given by the first and the second gradient it is possible to stay within a desired region at a desired operating point 703 for a time during for reliably estimating a friction estimate without risking sliding of the tires.

Figure 8:
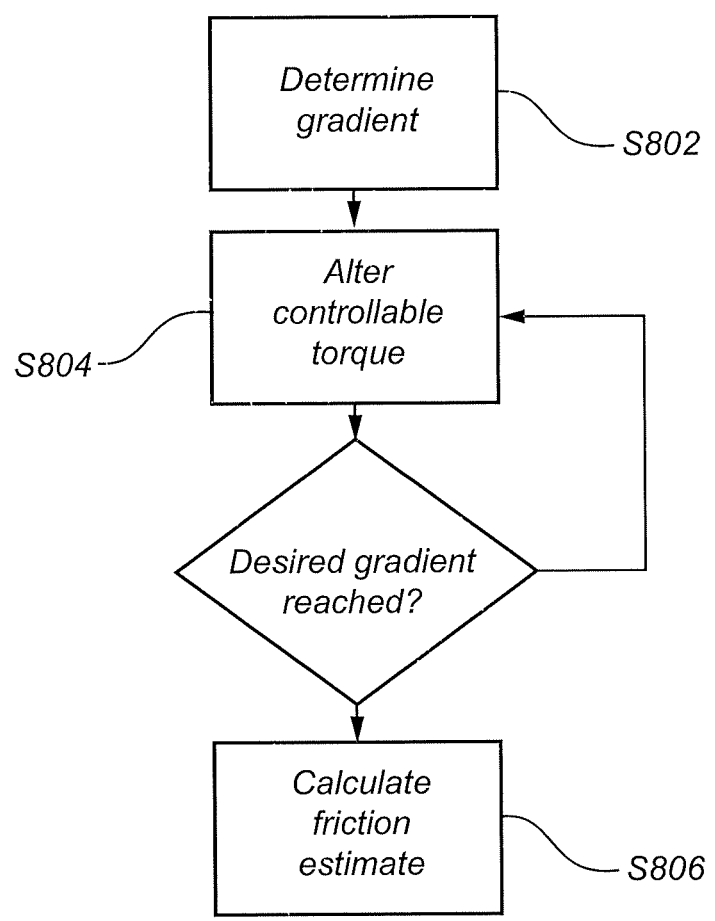
FIG. 8 is a flow-chart of method steps according to an exemplary embodiment of the disclosure.

Accordingly, and as illustrated in the flow chart in FIG. 8, first the desired gradient is determined S802 for reaching the desired operating point 703. The present gradient is monitored by determining the force (lateral or longitudinal force) along with the slip (slip angle or longitudinal slip) from vehicle state estimation. The controllable torque is altered S804 and it is checked whether the desired gradient has been reached. If this is not the case, the controllable torque is further altered. In other words, the present gradient is compared with the desired gradient and the result of the comparison is fed back to a control unit (e.g., control unit 310 in FIG. 3) such that the torque may be further altered. When the present gradient has reached the desired gradient corresponding to the desired operating point 703, the friction estimate is computed S806.

The calculation of the friction estimate may be conceptually understood in the following way. The force may be expressed as a function of friction, stiffness and slip, i.e., force=f($\mu$, $\kappa$, slip), and we also have the gradient at hand, df/ds where f is force and s is slip. The gradient may be calculated by varying the force and slip, i.e., applying torque and estimating slip and the variation in slip caused by the variation in force. From the two equations:

force=$f(\mu,\kappa,\text{slip})$, and gradient=$df/ds$, it is possible to solve for the stiffness and the friction.

For the force, an exemplary tire model may be given by:

$$f = \mu \tanh\left(\frac{k}{\mu}s\right) \quad (1)$$

which gives:

$$\frac{\partial f}{\partial s} = \frac{4k \cosh\left(\frac{k}{\mu}s\right)}{\left(\cosh\left(\frac{2k}{\mu}s\right)+1\right)^2}. \quad (2)$$

From the equations (1) and (2), and with knowledge of the force, slip, and the gradient df/ds, it is possible to determine the friction μ and the stiffness κ.

Figure 9A:
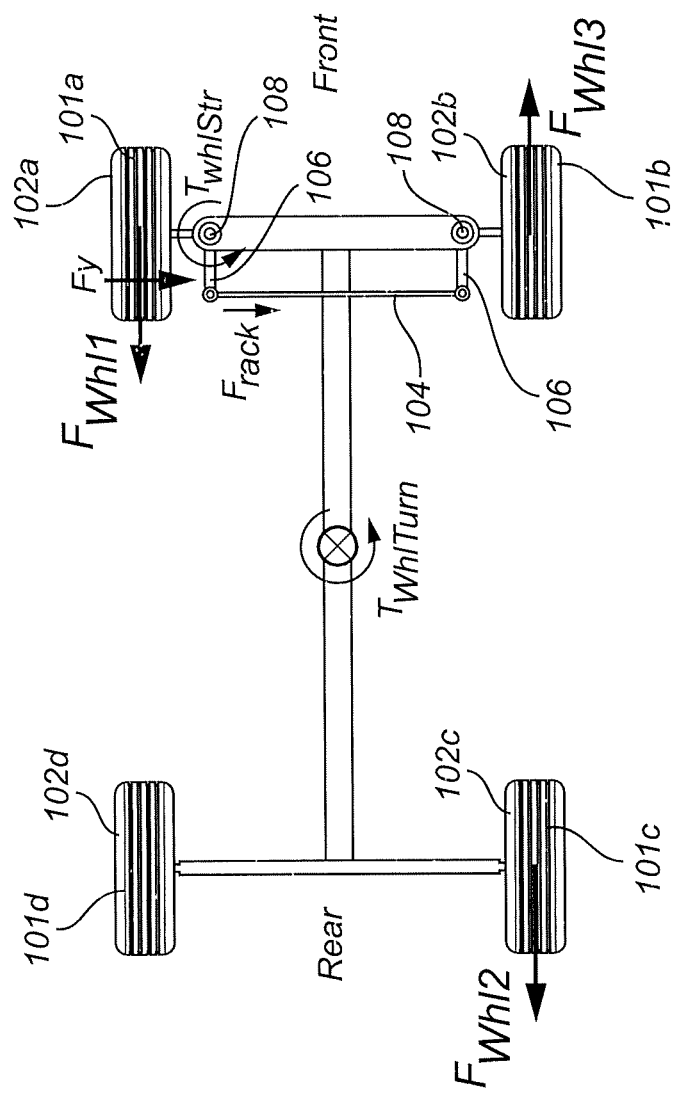
FIGS. 9A-B conceptually illustrate an embodiment of the disclosure.
Figure 9B:
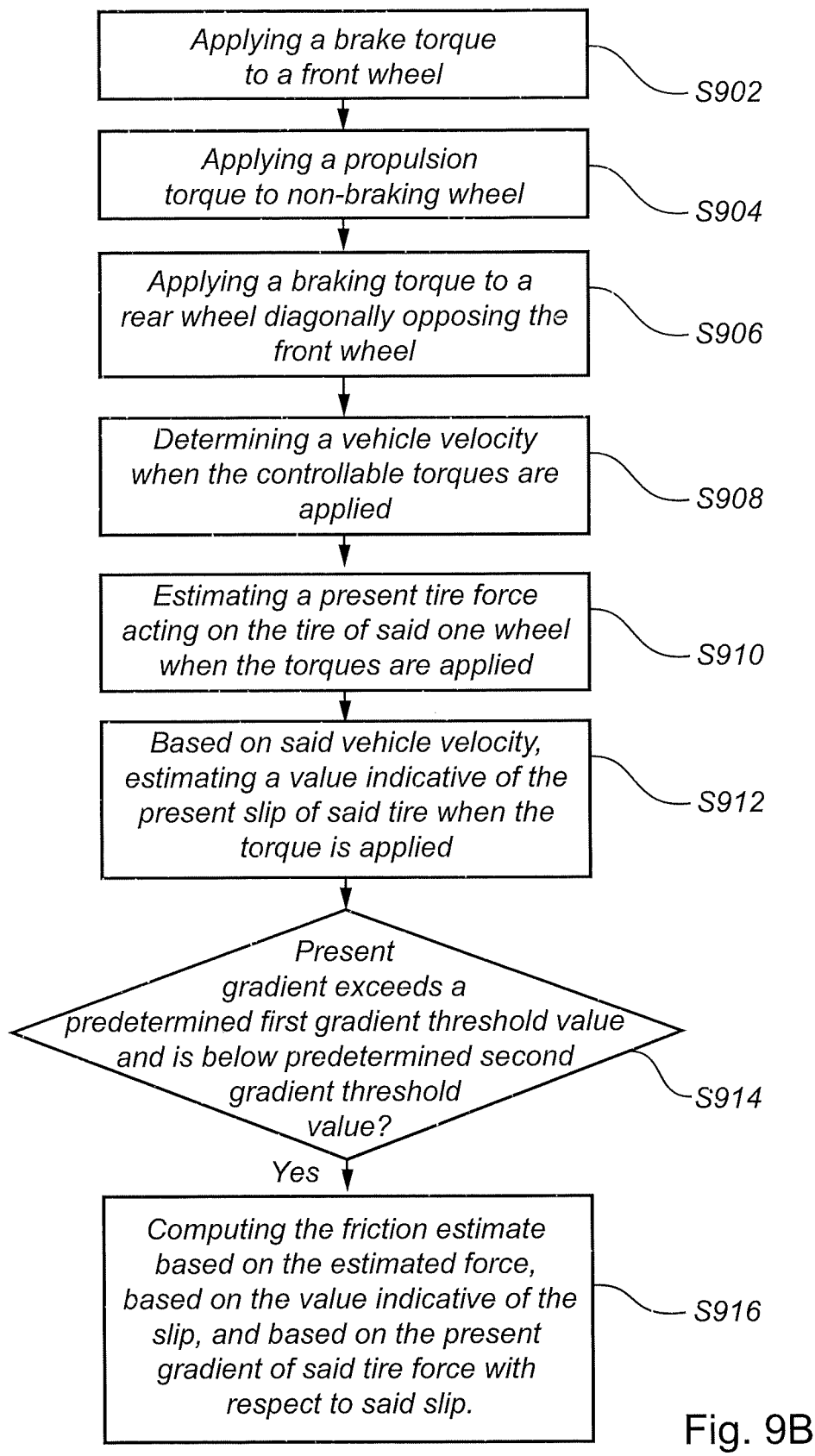

Turning now to FIGS. 9A-B which illustrate a flow-chart of method steps (FIG. 9B) and corresponding wheel torques and forces on vehicle wheels 102a-d and axle rack (FIG. 9A).

In the first step S902 a braking torque ($F_{Whl1}$) is applied to a front wheel 102a. A corresponding propulsion torque ($F_{Whl3}$) is applied (S904) to a non-braking wheel, in this case front wheel 102b to compensate for the braking of the vehicle caused by the braking torque ($F_{Whl1}$). In addition (S906), a brake torque ($F_{Whl2}$) is applied to the rear wheel 102c arranged diagonally opposing the first wheel 102a in order to avoid generating a turning yaw for the vehicle 100. The vehicle velocity is determined in step S908 and the present tire force on one of the tires which is subjected to one of the torques, in this case tire 101a, is determined in step S910 when the torques are applied. Subsequently S912, a value indicative of the present slip for tire 101a is determined based on at least the vehicle velocity.

It is determined whether the magnitude of the propulsion torque and braking torques are such that the present gradient of a measured tire force with respect to slip exceeds a predetermined first gradient threshold value and is below predetermined second gradient threshold value, the first gradient threshold value being set to avoid an undesirable sliding condition for said tire. If the above condition is fulfilled, the friction estimate is computed S916 based on the estimated force, the value indicative of the slip, and the present gradient of said tire force with respect to said slip.

With the above described methods, the friction estimate can be probed and computed while the vehicle is travelling along a course without substantially affecting the course. Thus, the driver and the passenger of the vehicle may not notice the friction estimate computation including the applied forces and torques. For example, the friction estimation may be performed while cornering or driving along a straight course.

As one skilled in the art would understand, the system 300, the torque applying unit 306, the internal measurement unit 308, the control unit 310, and any other system, subsystem, unit, device or module described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for computing a friction estimate between a road surface and a tire of a vehicle when the vehicle is in motion along a course, the vehicle comprising two front wheels and two rear wheels, the method comprising:
    applying a controllable torque to at least one of the two front wheels and two rear wheels;
    determining a vehicle velocity when the controllable torque is applied;
    estimating a present tire force acting between a tire of the at least one wheel and the contact surface of the tire, when the torque is applied;
    based on the vehicle velocity, estimating a value indicative of present slip of the tire when the torque is applied;
    determining a present gradient of tire force with respect to slip based on a variation in slip caused by a variation in tire force produced when the torque is applied;
    wherein when a magnitude of the controllable torque is such that the present gradient of tire force exceeds a predetermined first gradient threshold value and is below a predetermined second gradient threshold value, the first gradient threshold value being set to avoid an undesirable sliding condition for the tire:
        computing the friction estimate based on the estimated present tire force, the value indicative of the present slip, and the present gradient of tire force with respect to slip.

2. The method according to claim 1, wherein the second gradient threshold value is based on a minimum slip condition for the tire.

3. The method according to claim 1 further comprising:
    determining a desired gradient of tire force with respect to slip, the desired gradient being above the predetermined first gradient threshold value and below the predetermined second gradient threshold value, and
    altering the controllable torque until the present gradient of tire force reaches the desired gradient before computing the friction estimate.

4. The method according to claim 3 further comprising:
    maintaining the present gradient of tire force close to the desired gradient within an allowable margin for a predetermined time duration.

5. The method according to claim 1 wherein applying the controllable torque comprises:
    applying first controllable torque to the at least one of the front wheels and rear wheels; and
    applying a second controllable torque to another one of the front wheels and rear wheels;
    wherein the first controllable torque and the second controllable torque are such that net force and net torque on the vehicle caused by any one of the first controllable torque and the second controllable torque is compensated for by the other one of the first controllable torque and the second controllable torque; wherein when magnitudes of the controllable torques are such that the present gradient of tire force with respect to slip exceeds a predetermined first gradient threshold value and is below a predetermined second gradient threshold value, the first gradient threshold value being set to avoid an undesirable sliding condition for the tire:

computing the friction estimate based on the estimated present tire force, the value indicative of the present slip, and the present gradient of tire force with respect to slip.

6. The method according to claim 1, wherein the estimated present tire force is a longitudinal tire force along an axis parallel with a vehicle wheel hub direction and the controllable torque(s) is/are tractive torque(s) or braking torque(s).

7. The method according to claim 1, wherein the estimated present tire force is a lateral tire force orthogonal to a vehicle wheel hub direction and the controllable torque(s) is/are a yaw torque(s).

8. The method according to claim 1, wherein the estimated present tire force comprises a combination of a longitudinal tire force and a lateral tire force and the controllable torque(s) is/are a combination of a yaw torque and tractive torque(s) and/or braking torque(s).

9. A system for computing a friction estimate between a road surface and a tire of a vehicle when the vehicle is in motion along a course, the vehicle comprising two front wheels and two rear wheels, the system comprising:

a torque applying unit for applying a controllable torque to at least one of the two front wheels and the two rear wheels;

an inertial measurement unit and a vehicle speed sensor for determining a velocity of the vehicle; and a control unit configured to:
control the torque applying unit to apply a controllable torque to the at least one of the two front wheels and two rear wheels;
receive a vehicle velocity from the inertial measurement unit or the vehicle speed sensor when the controllable torque is applied;
estimate a present tire force acting between a first tire and the contact surface of the first tire, and a value indicative of present slip of the first tire when the torque is applied based on the vehicle velocity;
determine a present gradient of tire force with respect to slip based on a variation in slip caused by a variation in tire force produced when the torque is applied; and
when a magnitude of the controllable torque is such that the present gradient of tire force exceeds a predetermined first gradient threshold value and is below a predetermined second gradient threshold value, the first gradient threshold value being set to avoid an undesirable sliding condition for the first tire, compute the friction estimate based on the estimated present tire force, the value indicative of the present slip, and the present gradient of tire force with respect to slip.

10. The system according to claim 9, wherein the second gradient threshold value is based on a minimum slip condition for the first tire.

11. The system according to claim 9, wherein the control unit is further configured to:
determine a desired gradient of tire force with respect to slip, the desired gradient being above the predetermined first gradient threshold value and below the predetermined second gradient threshold value, and
control the torque applying unit to alter the controllable torque until the present gradient of tire force reaches the desired gradient before computing the friction estimate.

12. The system according to claim 11, wherein the control unit is configured to maintain the present gradient of tire force close to the desired gradient within an allowable margin for a predetermined time duration.

13. The system according to claim 9, wherein the vehicle speed sensor is a wheel speed sensor, a GPS, an optical speed sensor, or a combination thereof.

14. A vehicle comprising the system according to claim 9.

15. The vehicle according to claim 14, wherein the vehicle is an autonomous vehicle.

16. A system for computing a friction estimate between a road surface and a tire of a vehicle when the vehicle is in motion along a course, the vehicle comprising two front wheels, two rear wheels, a torque applying unit for applying a controllable torque to at least one of the two front wheels and two rear wheels, and at least one of an inertial measurement unit and a vehicle speed sensor for determining a velocity of the vehicle, the system comprising:

a control unit configured to:
control the torque applying unit to apply a controllable torque to the at least one of the two front wheels and two rear wheels;
receive a vehicle velocity from the inertial measurement unit or the vehicle speed sensor when the controllable torque is applied;
estimate a present tire force acting between a first tire and the contact surface of the tire, and a value indicative of present slip of the first tire when the torque is applied based on the vehicle velocity;
determine a present gradient of tire force with respect to slip based on a variation in slip caused by a variation in tire force produced when the torque is applied; and when a magnitude of the controllable torque is such that the present gradient of tire force exceeds a predetermined first gradient threshold value and is below a predetermined second gradient threshold value, the first gradient threshold value being set to avoid a sliding condition for the first tire, compute the friction estimate based on the estimated present tire force, the value indicative of the present slip, and the present gradient of tire force with respect to slip.

\* \* \* \* \*